(12) United States Patent
Rogers et al.

(10) Patent No.: US 9,663,589 B2
(45) Date of Patent: May 30, 2017

(54) COAGULATION OF BIOPOLYMERS FROM IONIC LIQUID SOLUTIONS USING $CO_2$

(71) Applicant: The Board of Trustees of the University of Alabama, Tuscaloosa, AL (US)

(72) Inventors: Robin D. Rogers, Tuscaloosa, AL (US); Patrick S. Barber, Tuscaloosa, AL (US); Chris S. Griggs, Vicksburg, MS (US); Gabriela Gurau, Tuscaloosa, AL (US); Xingmei Lu, Beijing (CN); Suojiang Zhang, Beijing (CN)

(73) Assignees: The Board of Trustees of The University of Alabama, Tuscaloosa, AL (US); The Intellectual Property Office of Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/767,841

(22) PCT Filed: Feb. 13, 2014

(86) PCT No.: PCT/IB2014/058981
§ 371 (c)(1),
(2) Date: Aug. 13, 2015

(87) PCT Pub. No.: WO2014/125438
PCT Pub. Date: Aug. 21, 2014

(65) Prior Publication Data
US 2015/0368371 A1    Dec. 24, 2015

Related U.S. Application Data (60) Provisional application No. 61/764,770, filed on Feb. 14, 2013.

(51) Int. Cl.
| | | |
|---|---|---|
| C08B 37/08 | (2006.01) |
| C08B 15/08 | (2006.01) |
| C08B 37/00 | (2006.01) |
| C08J 3/14 | (2006.01) |
| C08L 5/08 | (2006.01) |
| C08L 97/02 | (2006.01) |
| C08J 5/08 | (2006.01) |

(52) U.S. Cl.
CPC ............ *C08B 37/003* (2013.01); *C08B 15/08* (2013.01); *C08B 37/0003* (2013.01); *C08J 3/14* (2013.01); *C08L 5/08* (2013.01); *C08L 97/02* (2013.01); *C08J 5/08* (2013.01); *C08J 2300/16* (2013.01); *Y02P 20/544* (2015.11)

(58) Field of Classification Search
CPC .................................................. C08B 37/0003
See application file for complete search history.

(56) References Cited

U.S. PATENT DOCUMENTS

| | | | |
|---|---|---|---|
| 8,182,557 B2 | 5/2012 | Argyropoulos | |
| 2006/0241287 A1 | 10/2006 | Hecht et al. | |
| 2007/0161095 A1 | 7/2007 | Gurin | |
| 2008/0164440 A1 | 7/2008 | Maase et al. | |
| 2009/0221813 A1 | 9/2009 | Moellmann et al. | |
| 2012/0115729 A1 | 5/2012 | Qin et al. | |
| 2012/0245336 A1 | 9/2012 | Daly et al. | |
| 2012/0291773 A1 | 11/2012 | O'Connor | |
| 2014/0309416 A1* | 10/2014 | Teixeira | C08H 8/00 536/127 |

FOREIGN PATENT DOCUMENTS

| | | |
|---|---|---|
| WO | 2006116126 A2 | 11/2006 |
| WO | 2007111605 A1 | 10/2007 |
| WO | 2008095252 A1 | 8/2008 |
| WO | 2012033973 A1 | 3/2012 |

OTHER PUBLICATIONS

Barber, Patrick S. et al., "Coagulation of Chitin and Cellulose from 1-Ethyl-3methylimidazolium Acetate Ionic-Liquid Solutions Using Carbon Dioxide." Angewandte Chemie, Oct. 2, 2013, vol. 125, No. 47, pp. 12576-12579.

Gurau, Gabriela et al., "Demonstration of Chemisporption of Carbon Dioxide in 1,3-Dialkylimidazilium Acetate Ionic Liquids" Angewandte Chemie International Edition, Oct. 3, 2011, vol. 50, No. 50 pp. 12024-12026.

International Search Report and Written Opinion issued in related International Application No. PCT/IB2014/058981 on May 28, 2014.

Non-Final Office Action issued in related U.S. Appl. No. 13/428,786 on Jul. 24, 2014.

International Preliminary Report on Patentability issued in related International Application No. PCT/IB2014/058981 on Aug. 18, 2015.

Non-Final Office Action issued in related U.S. Appl. No. 13/428,786 on Aug. 20, 2015.

* cited by examiner

*Primary Examiner* — Wenwen Cai
(74) *Attorney, Agent, or Firm* — Meunier Carlin & Curfman LLC (57) ABSTRACT

Disclosed herein are processes for providing a biopolymer from a biomass or source of chitin using ionic liquids. The processes involve contacting a biomass or source of chitin with an ionic liquid to produce a biopolymer comprising solution and precipitating the biopolymer from the solution with supercritical $CO_2$, gaseous $CO_2$, or combinations thereof.

21 Claims, 3 Drawing Sheets

COAGULATION OF BIOPOLYMERS FROM IONIC LIQUID SOLUTIONS USING $CO_2$

CROSS REFERENCE TO RELATED APPLICATIONS

This application claims the benefit of priority to U.S. Provisional Application 61/764,770, filed Feb. 14, 2013, which is incorporated by reference herein in its entirety.

FIELD

Disclosed herein are processes for providing biopolymers from ionic liquids using supercritical $CO_2$, gaseous $CO_2$, or combinations thereof.

BACKGROUND

Ionic liquids (ILs) have been the subject of extensive research in recent years and currently represent a new-generation in chemistry. The availability of a variety of cations and anions lend to their unique properties, making them suitable for different applications with potential uses in various market segments, e.g., in the chemical, bio-chemical, pharmaceutical, and technical industries, as solvents, catalysts, electrolytes, or other types of chemicals. ILs also offer considerable efficiency and safety benefits.

ILs have received attention for their abilities to efficiently dissolve and process cellulose, chitin, and other natural biomaterials such as wood, which contains cellulose, hemicelluloses, and lignin (see Swatloski et al., *J. Am. Chem. Soc.* 2002, 124, 4974-4975; Sun et al., *J. Mater. Chem.* 2008, 18, 283-290; Qin et al., *Green Chem.* 2010, 12, 968-971; and Sun et al., *Green Chem.* 2009, 11, 646-655). The general procedure includes dissolving biomass in IL, then casting the IL-biomass solution on a glass plate and treating it with coagulating solvent (e.g., DI water or ethanol) to form a film; or extruding the IL-biomass solution into a water bath to produce fibers. In either of the procedures, water was mostly used as coagulant (a non solvent for biomass) to help precipitate biopolymers out of the IL solution and form the desired shape for target end use.

Even though ILs have found a number of industrial applications in biomass processing, several major challenges must be overcome to facilitate the application of the IL technologies into viable commercial process. Among these issues is the current high cost of ILs. Alternative manufacturing and mass-production schemes must be developed to produce an inexpensive IL that meets the desired application performance metrics. Even if the IL price could be sufficiently lowered, the process will need to operate in a closed-loop fashion (i.e., with recycling) to minimize the replenishment of the IL. This necessitates the development and engineering of a process that can efficiently deliver, transfer, and recover the IL.

Recovery of ILs after treatment with an aqueous or ethanolic coagulate solution is highly energy intensive (see Wu et al., *Chem. Eur. J.* 2009, 15, 1804-1810). The most common recovery method is to evaporate the solution out of the system to leave only an IL. However, the direct evaporation process is energy consuming, with much of the energy penalty attributed to boiling water/ethanol during the IL regeneration. Also, if the IL to be recovered is thermodynamically unstable, such processes should be avoided or minimized.

Liquid-liquid extraction is another method to recycle catalyst and IL solvent in certain organic reactions. However, recovery has only been demonstrated for some hydrophobic ILs, such as $[BF]^-$ and $[PF_6]^-$ containing ILs (see Smith et al., *Chem. Commun.*, 2000, 1249-1250; Fukuyama et al., *Org. Lett.* 2002, 4, 1691-1694). Using organic solvent in liquid-liquid extraction can also diminish the green aspect of using ILs. Aqueous biphasic systems (ABS) have been reported to have potential use for recycling hydrophilic ILs from aqueous solution. ABS forms while adding a water-structuring salt, $K_3PO_4$, to an aqueous solution of 1-butyl-3-methylimidazolium chloride ($[C_4mim]Cl$) or 1-Allyl-3-methylimidazolium chloride ($[Amim]Cl$) (see Gutowski et al., *J. Am. Chem. Soc.* 2003, 125, 6632-6633; Deng et al., *J. Chem. Eng. Data*, 2009, 54, 2470-2473). The bottom phase is $K_3PO_4$-rich while the upper phase is IL-rich, which is mixed with some water and salt. The IL could technically be recovered by drying the upper phase in a vacuum oven and then separating the crystallized $K_3PO_4$ by filtration. However, the major obstacle to applying this method into industrial practice is effectively removing the residue salt and water from the IL.

ILs were able to be separated from water using $CO_2$ at temperatures between 15-25° C. and pressures below 5.2 MPa. Solutions of water and ILs can be induced to form two liquid phases (IL-rich and water-rich) and one gas phase (mostly $CO_2$ with a small amount of dissolved water) (see Scurto et al., *Chem. Commun.* 2003, 572-573). However, a complete separation of IL from water was not achieved using this approach.

There is thus a long felt need for more efficient and more environmentally friendly processes of extracting biopolymers from biomass and using them to prepare, e.g., films, fibers, and beads. Disclosed herein are processes and compositions that address these and other needs.

SUMMARY

In accordance with the purposes of the disclosed materials, compounds, compositions, articles, devices, and methods, as embodied and broadly described herein, the disclosed subject matter relates to compositions and methods of making and using the compositions. In other aspects, the disclosed subject matter relates to processes for forming films, fibers, and beads from a biomass. In other aspects, the disclosed processes can directly extract biopolymers from a biomass with an ionic liquid and reconstitute them using supercritical $CO_2$, gaseous $CO_2$, or combinations thereof as the coagulant. In other aspects, the disclosed processes can directly extract chitin from a chitinous biomass, for example, from shrimp or crab shells with an ionic liquid. In still other aspects, pure or practical grade chitin can be dissolved with an ionic liquid. In the disclosed processes, the chitin can be reconstituted or coagulated from the ionic liquid by applying supercritical $CO_2$, gaseous $CO_2$, or combinations thereof. In still other aspects, the disclosed processes can directly extract cellulose from a cellulosic or lignocellulosic biomass with an ionic liquid. The cellulose and/or hemicellulose can be reconstituted from the ionic liquid by applying supercritical $CO_2$, gaseous $CO_2$, or combinations thereof. The disclosed processes can also involve the use of the recovered biopolymer to prepare fibers, films, and beads.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

BRIEF DESCRIPTION OF FIGURES

The accompanying figures, which are incorporated in and constitute a part of this specification, illustrate several aspects described below.

DETAILED DESCRIPTION

The compounds, compositions, articles, devices, and methods described herein may be understood more readily by reference to the following detailed description of specific aspects of the disclosed subject matter and the Examples included therein and to the Figures.

Before the present compounds, compositions, articles, devices, and methods are disclosed and described it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the solution" includes mixtures of two or more such solution, and the like.

"Optional" or "optionally" means that the subsequently described event or circumstance can or cannot occur, and that the description includes instances where the event or circumstance occurs and instances where it does not.

As used herein, the term "dissolving" means contacting a biomass with an ionic liquid to solubilize the biopolymers therein. Depending upon the relative purity of the biomass, some of the material present, especially impurities, will not dissolve and it is this undissolved material that is removed from the solublized biomass. As such, relatively pure grades of the biomass, for example, pure or practical grade chitin, will be completely "dissolved," whereas dried, ground biomass, for example, shrimp or crab shells will be "dispersed" with the effect that the chitin will be solublized and the impurities will not be.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, etc.

The term "anion" is a type of ion and is included within the meaning of the term "ion". An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion". A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

The term "precipitation," as used herein, means the production of an insoluble solid from a solution. Precipitation can also be referred to as "coagulation," "regeneration," or "reconstitution."

The following are non-limiting examples of aspects, iterations, and examples of the disclosed process. The following are not meant to be limiting in scope, but to provide an overview of the process and the combinations of steps that can comprise the disclosed process.

Methods

The methods disclosed herein utilize super-critical $CO_2$ (sc-$CO_2$), gaseous $CO_2$, or combinations thereof for the precipitation of biopolymers from an ionic liquid (IL) solution containing biomass. Previously, the direct dissolution of various biomasses like lignocellulose biomass or chitinous biomass into ILs had been done through a simple, low-energy microwave process. However, these processes had required an anti-solvent (also called a coagulant) such as water with high boiling points to precipitate the desired biopolymer. As a result, there is cost and effort (e.g., distillation) required to remove the anti-solvent from the IL if the IL is to be reused. Similarly, residual anti-solvent in the precipitated biopolymer also had to be removed, requiring energy intensive drying and/or extraction steps. The methods disclosed herein utilize sc-$CO_2$, gaseous $CO_2$, or combinations thereof as the anti-solvent to precipitate the biopolymer. Thus, the removal of the anti-solvent from the IL in the disclosed processes simply involves depressurizing the IL so that the $CO_2$ vaporizes. This allows the IL to be recycled at a much more cost-reduced process. Further, complete removal of the coagulant can be achieved by the further use of sc-$CO_2$, gaseous $CO_2$, or combinations thereof.

Disclosed herein is a process for extracting a biopolymer from a biomass that comprises contacting an ionic liquid with the biomass to form a biopolymer comprising solution and adding supercritical $CO_2$, gaseous $CO_2$, or combinations thereof to the solution to precipitate the biopolymer from the biopolymer comprising solution.

Biopolymers and Biomass

The disclosed methods can be used to extract a wide variety of biopolymers from various biomasses. The disclosed methods can make use of various types of biomass and thereby solubilize and precipitate various biopolymers therefrom. The term "biomass," as used herein, refers to living or dead biological material that can be used in one or more of the disclosed processes. In the disclosed methods the "biomass" can comprise any cellulosic, lignocellulosic, and/or chitinous biomass and can include materials comprising cellulose, chitin, chitosan, and optionally hemicellulose, lignin, starch, oligosaccharides and/or monosaccharides, their mixtures, and breakdown products (e.g., metabolites). Biomass can also comprise additional components, such as protein and/or lipid. Biomass can be derived from a single source, or biomass can comprise a mixture derived from more than one source. Some specific examples of suitable biomasses that can be used in the disclosed methods include, but are not limited to, bioenergy crops, agricultural residues, municipal solid waste, industrial solid waste, sludge from paper manufacture, yard waste, wood, and forestry waste. Additional examples of suitable types of biomass include, but are not limited to, corn grain, corn cobs, crop residues such as corn husks, corn stover, grasses, wheat, wheat straw, hay, rice straw, switchgrass, waste paper, sugar cane bagasse, sorghum, soy, components obtained from milling of grains, trees (e.g., pine), branches, roots, leaves, wood chips, wood pulp, sawdust, shrubs and bushes, vegetables, fruits, flowers, animal manure, multi-component feed, and crustacean biomass (i.e., chitinous biomass).

Lignocellulosic biomass typically comprises of three major components: cellulose, hemicellulose, and lignin, along with some extractive materials (Sjostorm, E. Wood Chemistry: Fundamentals and Applications, 2nd ed., 1993, New York.). Depending on the source, their relative compositions usually vary to certain extent. Cellulose is the most abundant polymer on Earth and enormous effort has been put into understanding its structure, biosynthesis, function, and degradation (Stick, R. V. Carbohydrates—The Sweet Molecules of Life, 2001, Academic Press, New York.). Cellulose is actually a polysaccharide consisting of linear chain of several hundred to over ten thousand $\beta(1\rightarrow4)$ linked D-glucose units. The chains are hydrogen bonded either in parallel or anti-parallel manner which imparts more rigidity to the structure, and a subsequent packaging of bound-chains into microfibrils forms the ultimate building material of the nature.

Hemicellulose is the principal non-cellulosic polysaccharide in lignocellulosic biomass. Hemicellulose is a branched heteropolymer comprising different sugar monomers with 500-3000 units. Hemicellulose is usually amorphous and has higher reactivity than the glucose residue because of different ring structures and ring configurations. Lignin is the most complex naturally occurring high-molecular weight polymer. Lignin relatively hydrophobic and aromatic in nature, but lacks a defined primary structure. Softwood lignin primarily comprises guaiacyl units, and hardwood lignin comprises both guaiacyl and syringyl units. Cellulose content in both hardwood and softwood is about 43±2%. Typical hemicellulose content in wood is about 28-35 wt %, depending on type of wood. Lignin content in hardwood is about 18-25% while softwood may contain about 25-35% of lignin.

While each of these components could be used in a wide variety of applications including synthesis of platform and commodity chemicals, materials, and production of energy, these components can rarely be separated from biomass in their original form. The principal reason has been the need of a universal processing media for biomass. The components of lignocellulosic biomass are held together by primary lignocellulosic bonds. Lignocellulosic bonds are varied in nature and typically comprise cross-linked networks. Traditionally, lignocellulosic biomass cannot be dissolved without degrading in any conventional solvents, and it can be difficult to separate these components in a pure form. However, immense possibilities of separated lignin and hemicellulose-based products have been widely studied. The impact of different process options to convert renewable lignocellulosic feedstocks into valuable chemicals and polymers has been summarized by Gallezot (*Green Chem.* 2007, 9, 295-302, which is incorporated by reference herein in its entirety for its teaching of feedstock processing.).

These biomasses contain various biopolymers that can be extracted and precipitated by the disclosed methods. For example, the disclosed methods can extract cellulose, hemicelluloses, chitin, and/or chitosan from a biomass. By the term "biopolymer" is meant herein any one or more of cellulose, hemicelluloses, chitin, chitosan, silk, or lignin.

The use of the disclosed processes to extract and precipitate chitin can be particularly beneficial. Chitin is an N-acetyl-D-glucosamine polymer that has a similar structure to cellulose. It is the most abundant polymer in the marine environment. Chitin is the main component of the exoskeletons of arthropods, such as crustaceans and in the cell walls of fungi. It has been a major source of surface pollution in coastal areas. Both chitin and its major derivative chitosan (obtained by deacetylation of chitin) have numerous applications. The bioactivity, biocompatibility, and low toxicity of native or chemically-modified chitin and chitosan make them suitable for controlled drug release, cosmetics, food preservation, fertilizer, or biodegradable packaging materials, or waste water processing and other industrial applications. Chitin, however, is highly hydrophobic and is insoluble in water and most organic solvents due to the high density of hydrogen bonds of the adjacent chains in solid state. The difficulty in the dissolution restricts the use of chitin as a replacement for synthetic polymers.

Crustacean shells are currently the major source of chitin available for industrial processing. The best characterized sources of chitin are shellfish (including shrimp, crab, lobster, and krill), oyster, and squids. Annual synthesis of chitin in freshwater and marine ecosystem is about 600 and 1600 million tons, respectively. Producing chitin in industry is primarily from the exoskeletons of marine crustacean shell waste by a chemical method that involves acid demineralization, alkali deproteinization, and followed by decolorization. Even though the current industrialized chemical process isolates chitin from crustacean shells efficiently, disadvantages exist in these procedures, including, inter alfa, the use of corrosive acids, bases, and strong oxidants which are not environmentally friendly. In addition, these processes can modify or nullify the desired physiochemical properties of chitin, for example, by acid demineralization, shorting the chitin chain length, as well as, degrading the chitin during deproteinization in hot alkali solutions. These undesired changes in the properties of chitin can have a profound affect when the chitin obtained therefrom must have specific molecular weight distributions and degrees of acetylation (DA).

So in one embodiment of the disclosed methods, chitin is extracted from a source of chitin by a method comprising contacting an ionic liquid with the source of chitin to form a chitin comprising solution; and adding supercritical $CO_2$ to the solution to precipitate chitin from the chitin comprising solution. A source of chitin that can be used in the disclosed methods can be a chitinous biomass. As used herein, the term "chitinous biomass" means any source of chitin, chitosan, or other polysaccharide derived from a marine exoskeleton (e.g., the shells of crustaceans like shrimp, crab, lobster, crawfish, prawns, etc.). As used herein, the term "chitosan" means deacetylated chitin or any other form of chemically modified chitin.

The disclosed processes can also extract chitin from a variety of other sources. Chitin derived from crustaceans is available from suppliers as "pure chitin" and as "practical grade chitin" and can be used herein. These forms of chitin undergo a process similar to the Kraft Process for obtaining cellulose from wood or other sources of cellulose. During the process of preparing pure chitin and practical grade chitin, there is a breakdown of the polysaccharide chains such that the resulting chitin has a shorter chain length and therefore a lower average molecular weight than it had before it was processed. Consequently, the precipitated chitin obtained when using the disclosed processes with these sources of chitin will likewise be of lower molecular weight than had the disclosed processes been followed with unprocessed chitinous biomass. Nonetheless, it can still be useful in various circumstances to use pure or practical grade chitin in the disclosed processes. Thus, in certain examples of the disclosed processes, the source of chitin can be pure or practical grade chitin.

One benefit of the disclosed processes, however, is that chitin can be obtained directly from chitinous biomass. As such, the disclosed processes provide a method of directly extracting chitin from a chitinous biomass without substantially shortening the polysaccharide chains. As such, the films, fibers, and beads formed from the disclosed process wherein the chitin is directly extracted from the chitinous biomass provides a unique method for obtaining polymeric materials comprising chitin that has the original full polysaccharide chain length (and molecular weight). Moreover the chitin can be substantially free of agents that are typically found in pure and practical grade chitin, such as methanesulfonic acid, trichloroacetic acid, dichloroacetic acid, formic acid, and dimethylacetamide. Thus, in certain examples of the disclosed processes, the source of chitin can be chitinous biomass.

Further, disclosed herein are processes wherein the precipitated chitin is cast into a film, a fiber, or a bead.

Step (a): Dissolving or Dispersing a Biomass to Form a Biopolymer Comprising Solution Step (a) of the disclosed process relates to dissolving or dispersing a biomass. Examples of biomass are disclosed herein. In specific examples, the disclosed process relates to dissolving or dispersing a source of chitin. The source of chitin can be chitinous biomass, pure chitin, technical or practical grade chitin, ground or pulverized exoskeleton of arthropods, i.e., crustaceans. In some examples, the source of chitin is pure chitin, for example, pure chitin obtained from crab shells, C9752, available from Sigma™ St. Louis, Mo. In other examples, the source of chitin is practical grade chitin obtained from crab shells, C7170, available from Sigma™ St. Louis, Mo. In further examples, the source of chitin is chitinous biomass, such as shrimp shells that are removed from the meat by peeling and processed to insure all shrimp meat is removed. However, any biomass comprising chitin or mixtures of chitin and chitosan, or mixtures of chitin, chitosan, and other polysaccharides can be used as the source of chitin in step (a).

In still other examples the biomass is a cellulosic or lignocelluloses biomass. Examples of these are hardwoods, softwoods, or a combination thereof. Any biomass comprising cellulose or hemicelluloses can be used herein.

When contemplating the biomass or source of chitin, the formulator can take into consideration the amount of biopolymer (e.g., chitin, cellulose, silk) that comprises the biomass or source of chitin. For example, "pure chitin" can comprise from about 75% to about 85% by weight of chitin. In one example, pure chitin comprises about 81.8% of chitin. "Technical grade" or "practical grade" chitin can comprise from about 70% to about 80% by weight of chitin. In one example, practical chitin comprises about 78.9% of chitin. As it relates to crude biomass sources, one example of shrimps skins or shells comprises 27.2% chitin, while, one example of crab shells comprises 23.9% chitin by weight.

In one aspect of the disclosed process, high molecular weight chitin is obtained by directly dissolving or dispersing a chitinous biomass in an IL. The chitin obtained by this process is not broken down into small polysaccharide chains as is the case with practical grade or pure grade chitin. As such, direct dissolution of chitin from a biomass allows the formulator to obtain high molecular weight chitin than can be subsequently used to form films, fibers, or beads having different properties than in the case wherein the source of chitin is not directly extracted from a chitinous biomass. The formulator can similarly obtain biopolymers with higher molecular weights, near their original value before extraction, than would otherwise be obtainable. In addition, as disclosed herein, the biomass derived biopolymer can be admixed with one or more adjunct ingredients to form polymeric compositions have properties not obtainable from pure or practical grade chitin.

In step (a) of the disclosed processes, the biomass or source of chitin is contacted with an IL at a temperature of from about 70° C. to about 130° C., from about 90° C. to about 110° C., or about 100° C. In other examples, the biomass or source of chitin is dissolved or dispersed at a temperature of from about 0° C. to about 70° C., from about 15° C. to about 30° C., or about 25° C.

In some examples, microwave heating is used in step (a) to dissolve the biopolymer when the biomass or source of chitin is a chitinous biomass, for example, shrimp shells. In one example, the chitinous biomass can be combined with an IL or an IL/co-solvent. The mixture is charge to a source of microwave radiation and the mixture heated to extract the chitin. In one example, short 1 to 5 second pulses are used, however, and pulse time can be used to extract the biomass chitin, i.e., 1 second, 2 seconds, 3 seconds, 4 seconds, or 5 seconds, or any fractional part thereof. For these examples, the temperature can be critical; however, microwave heating provides an efficient and desirable method for extracting high molecular weight biopolymers like chitin from a biomass or source of chitin.

Ionic Liquids

The following is a non-limiting disclosure of the ILs suitable for use in the disclosed process. Ionic liquids are a class of solvents composed of ionized species in contrast to traditional organic or aqueous solvents which are molecular non-ionics. Ionic liquids are salts that exist in the liquid phase at a temperature from about −70° C. to about 130° C. The ILs of the present disclosure comprise an organic cation and an organic or inorganic anion. The organic cation is typically formed by alkylation of a neutral organic species capable of holding a positive charge when a suitable anion is present.

Cations

The organic cation of the ILs disclosed herein can comprise a linear, branched, or cyclic heteroalkyl unit. The term "heteroalkyl" refers to a cation as disclosed herein comprising one or more heteroatoms chosen from nitrogen, oxygen, sulfur, boron, or phosphorous capable of forming a cation. The heteroatom can be a part of a ring formed with one or more other heteroatoms, for example, pyridinyl, imidazolinyl rings, that can have substituted or unsubstituted linear or branched alkyl units attached thereto. In addition, the cation can be a single heteroatom wherein a sufficient number of substituted or unsubstituted linear or branched alkyl units are attached to the heteroatom such that a cation is formed. For example, the cation [$C_n$mim] where n is an integer of from 1 to 8 can be used. Preferably, ILs with the cation [$C_{1-4}$mim] can be used. A particularly useful IL is 1-ethyl-3-methyl-1H-imidazol-3-ium acetate, [$C_2$mim]OAc, having the formulae:

is an example of an ionic liquid comprising a cyclic heteroalkyl cation; a ring comprising 3 carbon atoms and 2 nitrogen atoms.

Other non-limiting examples of heterocyclic and heteroaryl units that can be alkylated to form cationic units include imidazole, pyrazoles, thiazoles, isothiazoles, azathiozoles, oxothiazoles, oxazines, oxazolines, oxazaboroles, dithiozoles, triazoles, selenozoles, oxahospholes, pyrroles, boroles, furans, thiphenes, phospholes, pentazoles, indoles, indolines, oxazoles, isothirazoles, tetrazoles, benzofurans, dibenzofurans, benzothiophenes, dibenzothoiphenes, thiadiazoles, pyrdines, pyrimidines, pyrazines, pyridazines, piperazines, piperidines, morpholines, pyrans, annolines, phthalazines, quinazolines, and quinoxalines.

The following are examples of heterocyclic units that are suitable for forming a cyclic heteroalkyl cation unit of the disclosed ILs:

pyrrolidinium piperidinium

The following are further examples of heterocyclic units that are suitable for forming a cyclic heteroalkyl cation unit of the disclosed ILs:

where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, $R^5$, $R^6$, $R^7$, $R^8$, and $R^9$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The following comprises yet another set of examples of heterocyclic units that are suitable for forming heterocyclic dication units of the disclosed ILs and are referred to as such or as "geminal ionic liquids:" See Armstrong, D. W. et al., Structure and properties of high stability geminal dicationic ionic liquids, *J. Amer. Chem. Soc.* 2005; 127(2):593-604; and Rogers, R. D. et al., Mercury(II) partitioning from aqueous solutions with a new, hydrophobic ethylene-glycol functionalized bis-imidazolium ionic liquid, *Green Chem.* 2003; 5:129-135 included herein by reference in its entirety.

1,1'-[1,2-ethanediylbis(oxy-1,2-ethanediyl)]bis[3-methyl-1H-imidazolium-1-yl]

n = 3, 6, 9, 12    n = 3, 9 imidazolium and pyrrolidinium based di-cations where $R^1$, $R^4$, $R^9$, and $R^{10}$ comprise a substituted or unsubstituted linear, branched, or cyclic $C_1$-$C_6$ alkyl, or substituted or unsubstituted linear, branched, or cyclic $C_1$-$C_6$ alkoxy; each $R^5$, $R^6$, $R^7$, and $R^8$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The following is a description of the short hand method used throughout the specification for referring to the imidazolium-based ILs disclosed herein. The template:

[$C_n$mim]

represents the cation portion of the IL wherein $C_n$ represent an alkyl or substituted alkyl moiety having n number of carbon atoms. The term "mim" refers to "methyl substituted imidazolium." $C_n$mPy is likewise used to refer to Cn-methyl substituted pyridinium. Referring to the generic imidazolium formula:

wherein $R^3$, $R^4$, and $R^5$ are each hydrogen, can also be written as follows:

wherein either nitrogen can be depicted as having a positive charge. By the convention used herein the methyl group of "mim" refers to the $R^1$ moiety and the $C_n$ substituent is the $R^2$ moiety. Therefore [$C_2$mim] represents a cation having the formula:

which can be equally well represented by the formula:

In another example, the cation can be choline, $(CH_3)_3N^+CH_2CH_2OH$, noted herein as [Ch]. Choline is an essential water-soluble nutrient necessary for human function. Combined with the acetate anion (as shown in Scheme 1) an IL is formed with a melting point of 85° C.

Scheme 1 Synthesis of choline acetate ([Ch][OAc]) from choline hydroxide and acetic acid.

Anions

The choice of the anion in the IL can be particularly relevant to the rate and level of biopolymer dissolution. While not wishing to be bound by theory, the primary mechanism of solvation of carbohydrates by an IL is the anion's ability to break the extensive hydrogen-bonding networks by specific interactions with hydroxyl groups. Thus, it is believed that that the dissolution of chitin and cellulose is enhanced by increasing the hydrogen bond acceptance and basicity of the anion. Anions that also form less viscous ILs are also preferred. By using anions that can accept hydrogen bonds and that are relatively basic, one can not only dissolve pure chitin, but one can dissolve practical grade chitin and even extract chitin from raw chitinous biomass, as described herein. Accordingly, preferred anions are substituted or unsubstituted acyl units $R^{10}CO_2$, for example, formate $HCO_2^-$, acetate $CH_3CO_2^-$ (also noted herein as [OAc]), proprionate, $CH_3CH_2CO_2^-$, butyrate $CH_3CH_2CH_2CO_2^-$, and benzylate, $C_6H_5CO_2^-$; substituted or unsubstituted sulfates: $(R^{10}O)S(=O)_2O^-$; substituted or unsubstituted sulfonates $R^{10}SO_3^-$, for example $(CF_3)SO_3^-$; substituted or unsubstituted phosphates: $(R^{10}O)_2P(=O)O^-$; and substituted or unsubstituted carboxylates: $(R^{10}O)C(=O)O^-$. Non-limiting examples of $R^{10}$ include hydrogen; substituted or unsubstituted linear branched, and cyclic alkyl; substituted or unsubstituted linear, branched, and cyclic alkoxy; substituted or unsubstituted aryl; substituted or unsubstituted aryloxy; substituted or unsubstituted heterocyclic; substituted or unsubstituted heteroaryl; acyl; silyl; boryl; phosphino; amino; thio; and seleno. In especially preferred embodiments, the anion is $C_{1-6}$ carboxylate.

Still further examples of preferred anion are deprotonated amino acids, for example, Isoleucine, Alanine, Leucine, Asparagine, Lysine, Aspartic Acid, Methionine, Cysteine, Phenylalanine, Glutamic Acid, Threonine, Glutamine, Tryptophan, Glycine, Valine, Proline, Selenocysteine, Serine, Tyrosine, Arginine, Histidine, Ornithine, Taurine.

It is also contemplated that other anions, though not preferred, can still be used in some instances. However, in these instances, higher concentrations, longer mixing times, and higher temperatures can be required. One can use halides, (i.e., $F^-$, $Cl^-$, $Br^-$, and $I^-$), $CO_3^{2-}$; $NO_2^-$, $NO_3^-$, $SO_4^{2-}$, $CN^-$, arsenate(V), $AsX_6^-$; $AsF_6^-$, and the like; stibate (V) (antimony), $SbX_6^-$; $SbF_6^-$, and the like. Borides $BX_4^-$, wherein X represents halogen (i.e., $BF_4^-$, $BCl_4^-$), and phosphates (V), $PX_6^-$; $PF_6^-$, have, however, been found not to work.

Other non-limiting examples of IL anions include substituted azolates, that is, five membered heterocyclic aromatic rings that have nitrogen atoms in either positions 1 and 3 (imidazolates); 1, 2, and 3 (1,2,3-triazolates); or 1, 2, 4 (1,2,4-triazolate). Substitutions to the ring occur at positions that are not located in nitrogen positions (these are carbon positions) and include CN (cyano-), $NO_2$ (nitro-), and $NH_2$ (amino) group appended to the heterocyclic azolate core.

In some examples of suitable ILs, an anion is chosen from formate, acetate, propionate, butyrate, $(CF_3)SO_3^-$, $(R^{10}O)S(=O)_2O^-$; $(R^{10}O)_2P(=O)O^-$; $(R^{10}O)C(=O)O^-$; and $R^{10}CO_2^-$; each $R^{10}$ is independently $C_1$-$C_6$ alkyl. Anions that are chosen from $R^{10}CO_2$ have been found to be convenient in forming the compositions of step (a) in the compositions and processes disclosed herein.

The anion portion of the IL is written without the charge, for example, OAc, $CHO_2$, Cl, Br, $RCH_3OPO_2$, and $PF_6$.

IL Examples

The following are non-limiting examples of ILs written in the short hand convention with the corresponding formula:

i) [$C_2$mim]OAc having the formula:

ii) [$C_2$min]($C_2H_5O$)$SO_3$ having the formula:

iii) [$C_2$mim]X, where X is chloride or bromide, having the formula:

iv) [$C_2$mim]$RCH_3OPO_2$, where $RCH_3OPO_2$ is an alkane phosphonate with R being an alkyl chain, having the formula:

v) [$C_2$mim]($C_2H_5O$)$_2PO_2$ having the formula:

vi) [Amim]$CHCO_2$, where A is allyl, having the formula:

vii) [Amim]X, where A is allyl, and X is Cl or Br, having the formula:

viii) [$C_4$mim]X, where X is Cl or Br, having the formula:

ix) [$C_4$mim]OAc having the formula:

x) [C₄mim]CHCO₂ having the formula:

and xi) [C₄miPy]X, where X is Cl or Br, Py is pyrimidyl, having the formula:

and xii) [Ch][OAc], which can be synthesized in a one-pot process from choline hydroxide and acetic acid in high yields:

Of course, any of the anions in these specific examples can be combined with any other cations in these specific examples to form ILs suitable for use herein.

In a preferred example, the biomass (e.g., cellulosic, lignocellulosic, or chitinous biomass) or the source of chitin (e.g., pure or technical grade chitin) is contacted with 3-ethyl-1-methyl-1H-imidazol-3-ium acetate, [C₂mim]OAc, or choline acetate, [Ch][OAc]. [Ch][OAc] is also considered safe for consumption and therefore a very non-hazardous, non-volatile solvent for use in the disclosed processes. The use of [Ch][OAc] in the dissolution of crustacean shells provides improvements over current methods by utilizing a more readily available, cheaper, easy-to-synthesize, non-toxic, and non-hazardous material over standard imidazolium-based ILs. These ILs currently use halogenated alkylating reagents for production which are extremely hazardous and volatile and could be dangerous to workers in the facilities. These ILs are also expensive to manufacture and purify on a large scale. From commercially and naturally available choline hydroxide, choline acetate can be prepared in one step using acetic acid. The by-products from this reaction are water.

Any IL that effectively dissolves the biopolymer (e.g., cellulose, hemicelluloses, chitin, chitosan, silk, or other natural polysaccharide or polymer) present in the biomass or source of chitin can be used for step (a). What is meant by "effectively dissolves" is at least about 25% by weight of the biopolymer present is solubilized. In one example, at least about 45% of the biopolymer present is solubilized. In another example, at least about 60% of the biopolymer present is solubilized. In a further example, at least about 75% of the biopolymer present is solubilized. In a still further example, at least about 90% of the biopolymer present is solubilized.

The formulator can select the IL for use in this step of the disclosed process by the one or more factors, for example, solubility of the biomass and/or the biopolymer. One method of determining the choice of IL is as follows. The biomass or source of chitin is dissolved in an IL and heated in an oil at 100° C. for 19 hours in air. For example, practical grade (1 g) or pure chitin (0.5 g) are dissolved in 10 g of an IL. After heating, the undissolved residues from the sample are diluted with a small amount of DMSO (to reduce the viscosity, as well as remove any dissolved substances adsorbed or trapped within the solid texture), and then the solids are separated by centrifugation, washed with DI water, and then dried in an oven at 80° C. for 20 hours.

Table I below shows non-limiting examples of the solubility of various grades of a suitable starting material in various ILs at 100° C. wherein the solution is stirred for 19 hours. For pure chitin as the source of chitin, 0.5 g was dissolved in 2 g of the corresponding IL. For practical grade and shrimps shells as the source of chitin, 1 g is dissolved in 10 g of the corresponding IL.

TABLE I

|  | Percent mass dissolved, % | | |
| --- | --- | --- | --- |
|  | [C₂mim]Cl | [C₄mim]Cl | [C₂mim]OAc |
| Pure Chitin | 13.9 | 24.4 | 80.0 |
| Practical Grade Chitin | 4.2 | 6.8 | 15.2 |
| Shrimp shells | 9.7 | 10.0 | 46.0 |

Surprisingly, [C₂mim]OAc dissolved over five times as much pure chitin, over three times as much practical grade chitin, and nearly five times as much chitin from shrimp shells as [C₂mim]Cl. This data evidences the surprising effect the nature of the anion has on IL solvation of chitin. This data also shows that [C₄mim]Cl provides better solvation than [C₂mim]Cl. It is also noted that in all cases more pure chitin dissolved than practical grade chitin, likely because of the higher mineral content in the practical grade chitin.

Co-Solvents

In further examples, the disclosed processes can involve dissolving the biomass or source of chitin in an admixture of an IL and a co-solvent. The term "co-solvent" as used herein means any suitable solvent other than an IL, for example, DMSO. This example also includes multiple solvents, for example, two or more ILs and one co-solvent, one IL and two or more co-solvents, and two or more ILs and two or more co-solvents. For these examples, any ratio of IL to co-solvent can be used, for example, from about 5:95 IL/co-solvent to 95:5 IL/co-solvent weight/weight. In one example, the ratio of IL to co-solvent is 25:1. The use of a cosolvent can reduce the viscosity of the biopolymer comprising solution.

Separating the Undissolved Material

It is possible that, depending on the biomass or source of chitin, insoluble particulate matter can be found in the biopolymer comprising solution. It is often desirable that such non-solublized material be separated from the solublized biopolymers present in the IL. Thus, in other examples, the disclosed processes can comprise removing impurities or undissolved material from the biopolymer comprising solution before the precipitation step with sc-CO₂.

The non-solublized material can be inorganic matter, as can be the case when clam shells or shrimp skins/shells or other chitinous biomass are used as the source of chitin. In one example, the non-solublized material is the desired biopolymer (e.g., chitin or cellulose); however, due to the process conditions chosen by the formulator, the solids are separated before all of the biopolymer is in solution. In practice, undissolved biopolymer can be recycled into step (a). The undissolved material can be removed by any process chosen by the formulator. For example, the material can be removed by centrifugation, filtration, or by decanting the liquid phase.

Step (b): Adding $CO_2$ to Precipitate the Solublized Biopolymer

Step (c) of the disclosed process relates to adding a coagulant or anti-solvent to the biopolymer solution obtained in step (a). The coagulant causes the solubilized matter (e.g., chitin, chitosan, cellulose, silk, or other biopolymer) to be regenerated in solid form. In the processes disclosed herein, $CO_2$ is the coagulant (anti-solvent) that is used to precipitate the solubilized biopolymer, where the $CO_2$ can be supercritical $CO_2$, gaseous $CO_2$, or combinations thereof.

Supercritical $CO_2$ can be prepared in a critical point dryer or other similar apparatus that can be pressurized and heated to above the critical point of $CO_2$. The critical point for $CO_2$ is 31.1° C. and 1073 psi (7400 kPa). Thus, this step can be performed by contacting the chitin comprising solution with $CO_2$ at above 31.1° C. and 1073 psi (7400 kPa), at 31.1° C. and above 1073 psi (7400 kPa), or above 31.1° C. and above 1073 psi (7400 kPa). For example, the chitin comprising solution can be placed in a chamber filled with $CO_2$. The chamber can then be heated to about 50° C. and pressurized to about 1100 psi (7600 kPa) and maintained under the appropriate conditions to coagulate the biopolymer (1-4 h).

It is also contemplated that the biopolymer comprising solution can be placed in a porous sample holder. Upon application of the sc-$CO_2$, the IL can be washed away, and the precipitated biopolymer can be retained in the sample holder.

Gaseous $CO_2$ can be introduced into the sample through sparging in a number of ways, for example through a simple single needle or a porous glass diffuser.

In some embodiments, the $CO_2$ can be generated by combustion, such as, for example, burning natural gas or propane, or by oxidizing or electrolysis of oxalic acid.

Additionally, $CO_2$ can be produced by a chemical reaction, such as, for example, the decomposition of $CO_3^{2-}$, which, for example, can occur by mixing $Na_2CO_3$ or $NaHCO_3$ with an acid.

In some embodiments, an additional base is added to the system. The additional base can comprise, for example, $Na_2CO_3$, KOH, $NaHCO_3$, nitrogen-containing bases, or combinations thereof.

Isolating the Regenerated Biopolymer

After the biopolymer (e.g., cellulose, hemicellulose, silk chitin, and/or chitosan) is precipitated, it can be isolated from the IL phase. The regenerated biopolymer can be isolated in any manner chosen by the formulator, for example, the regenerated biopolymer can be removed by centrifugation, filtration, or by decanting the liquid phase. The solid material can then be washed with a minimal amount of water or another anti-solvent (e.g., ethanol).

The films, fibers, or beads can be formed by any process chosen by the formulator. The disclosed fibers can be manufactured by extrusion, i.e., by forcing the solution comprising regenerated biopolymer through tiny holes of a spinneret to form continuous filaments of semi-solid polymer. The spinnerets used can be any chosen by the formulator that is consistent with the properties of the regenerated biopolymer. For example, the spinneret may have from one to several hundred holes. Because the disclosed process provides highly purified biopolymer, there are few, if any, impurities to occlude the tiny openings. Each of the four general methods for spinning filament, for example, wet, dry, melt, and gel spinning can be adapted for use with the present process. Electrospinning of the biopolymer can also be used to draw fibers from the biopolymer.

IL Recycling

Through the coagulation process using supercritical $CO_2$, gaseous $CO_2$, or combinations thereof, the IL reacts to form an insoluble species in the solution. In some examples, this material is more dense than the other materials and therefore remains at the bottom of the vessel. Both this material and the IL can be recycled and used again in the disclosed processes. Because the coagulant used herein is sc-$CO_2$, gaseous $CO_2$, or combinations thereof, the removal of the coagulant from the IL is simple and can be accomplished by reducing pressure so that the $CO_2$ vaporizes from the solution. The solid material can be converted back into the IL for reuse through the addition of the corresponding acid. In both cases, the precipitated biopolymer can be again dissolved in an IL as noted before.

Additional Embodiments

Also, disclosed herein is a process for preparing a regenerated biopolymer-synthetic polymer blend, e.g., a chitin-polymer blend. The disclosed process comprises combining a synthetic polymer with a biopolymer comprising solution to form an admixture, and then contacting the mixture with sc-$CO_2$ to precipitate a biopolymer-synthetic polymer blend. The biopolymer comprising solution can be prepared as discussed above where a biomass or source of chitin is contacted with an IL. The additional polymer that is added can be combined with the biopolymer comprising solution by admixing the polymer into the solution or by forming a solution or admixture of the polymer in an ionic liquid and combining that solution with the biopolymer comprising solution.

The additional polymer can be a synthetic polymer, for example, poly(2-hydroxyethyl methacrylate) (poly-HEMA), poly(lactic acid) (PLA), polyethylterephthalate, polystyrene, polyethylene, or nylon.

Similarly, the disclosed methods can comprise adding an adjunct ingredient, such as a pharmaceutical, herbicides, insecticides, or food ingredient, to the biopolymer comprising solution before the precipitation step with sc-$CO_2$.

Uses:

Utilizing the processes disclosed herein biopolymers can be directly extracted from biomass without a high-boiling solvent. For example, using the processes disclosed herein chitin can be directly extracted from chitinous biomass like shrimp shells and precipitated without a high-boiling solvent. With the higher molecular weight and purity of biopolymers like chitin that comes from this process, stronger materials (e.g., clothing fibers, medical bandages, filter membranes) can be produced at a large scale. As such, the compositions prepared as disclosed herein can have many uses. They can be fashioned into beads, fibers, films, aerosols, or shaped into particles or other forms. In a particularly useful method, chitin fibers can be prepared according to the disclosed methods and be used in bandages, coated sutures. Other medical applications include contact lenses. The disclosed chitin compositions can also be impregnated with actives and be used for drug delivery. Still further, the disclosed compositions can be used in various cosmetic applications, such as toothpaste, moisturizers, body creams, and make-up. The disclosed compositions can be used in various food applications as preservatives, color stabilizers, or animal feed additives. The disclosed compositions can be used in various agricultural applications, such as a seed coating, leaf coating, or for controlled agrochemical release. The disclosed compositions can be used in environmental applications, such as water treatment, oil remediation, metal ion removal, or as flocculants/coagulants. The disclosed compositions can be used in biotechnology, e.g., for cell immobilization and recovery, protein separations, or glucose electrodes.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process.

Example 1: Dissolution of Shrimp Shells into Ionic Liquids:

0.600 g Shrimp shells were dissolved in either 29.400 g [Ch][OAc] or [$C_2$mim][OAc] through a microwave dissolution process in a domestic microwave oven (SHARP Carousel R-209KK, Mahwah, N.J.) at full power as previously reported (Qin, et al., *Green Chem.*, 2010, 12:968; WO 2010141470). The solution was heated for a total of two minutes, utilizing 2-3 second pulses and mechanical stirring between pulses. After two minutes there remained undissolved particles typical of this type of dissolution and relating to proteins and minerals, such as $CaCO_3$. The [Ch][OAc] solution was a light brown and the [$C_2$mim][OAc] solution was dark brown after dissolution and both were highly viscous after cooling to room temperature. A solution of regenerated chitin, chitin that has previously been dissolved, extracted, coagulated with water, and dried, was prepared by adding 0.089 g of regenerated chitin to 5.018 g of [$C_2$mim][OAc] in a 20 mL vial and heating (oil bath, 100° C.) for 2 h. The entirety of the regenerated chitin sample dissolved and there were no insoluble materials remaining.

Example 2a: Precipitation of Chitin Using sc-$CO_2$

Figure 1:
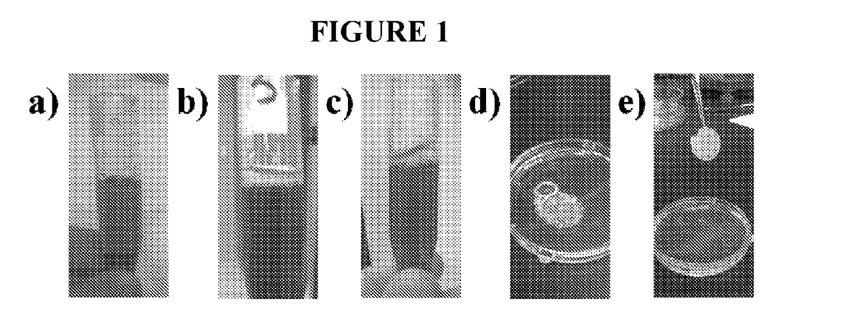
FIG. 1 is a group of photographs showing the separation of chitin from an IL solution of crustacean shells.
Figure 2:
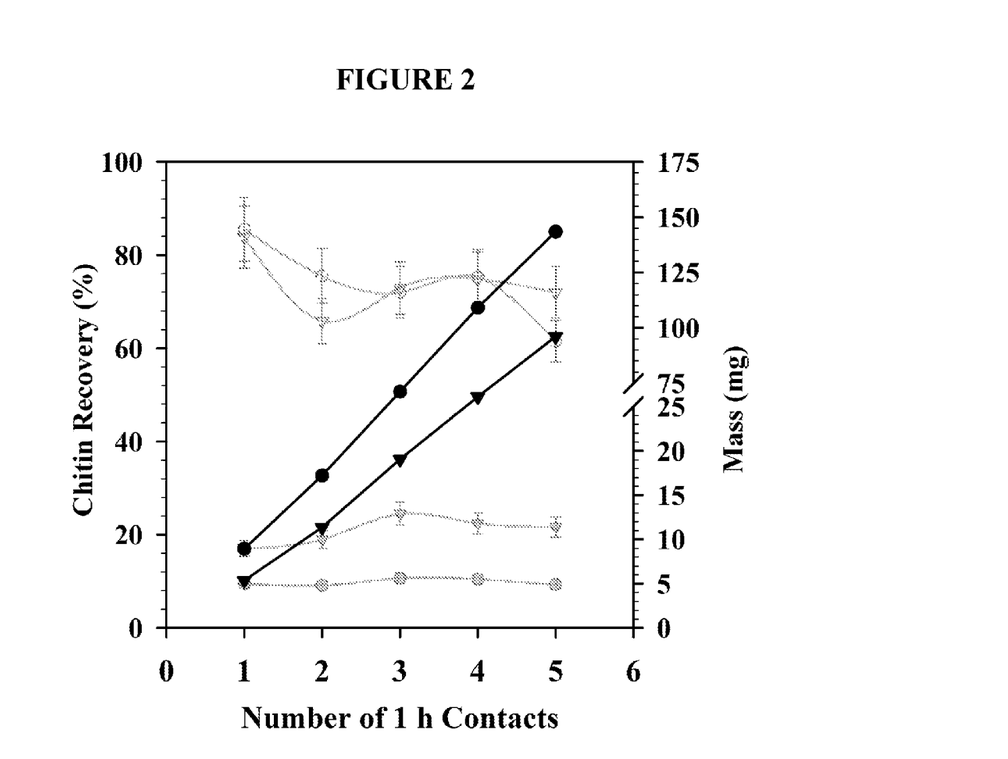
FIG. 2 shows cumulative chitin recoveries and mass of chitin recovered per 1 h contact from solutions of chitin extracted from shrimp shells and regenerated chitin in [$C_2$mim][OAc].

The solutions from Example 1 were centrifuged to remove all undissolved particles and 5 mL of each solution was decanted into 8 mL centrifuge tubes for the sc-$CO_2$ experiment. Performed individually, the solutions were introduced into the high-pressure apparatus (Denton DCP-1 Critical Point Dryer). The system was degassed by purging with $CO_2$ at room temperature. After 1 minute, the system was sealed and the temperature was increased by use of a water bath (50° C.). The pressure was released occasionally to maintain 1100 psi, conditions for sc-$CO_2$, for a duration of 1-4 h, after which the system pressure was released and the sample was removed. The chitinous material had precipitated from the solution and formed a skin on the top of the solution (see FIG. 1). Additionally, the remaining solution can be placed back into the high-pressure apparatus and contacted for an additional 1-4 h. Several short (1 h) contacts of sc-$CO_2$ will allow for the coagulation of up to >95% of the available chitin from the solution (FIG. 2). FIG. 2 shows cumulative chitin recoveries (left axis, bars) and mass of chitin recovered per 1 h contact (right axis, . . . ) from solutions of chitin extracted from shrimp shells (dark grey and ●) and regenerated chitin (light grey and ▼) in [$C_2$mim][OAc].

Example 2b: Precipitation of Chitin Using Gaseous $CO_2$

After achieving complete dissolution of a regenerated chitin solution from Example 1, $CO_2$ (atmospheric pressure), was bubbled through at room temperature using a syringe immersed into the solution. The gas flow was kept constant at 0.18 scfh (84 mL/min). After ca. 3 h, the solution became so viscous, that no further bubbling could be observed. The identity of the mixture of products including chitin was confirmed by NMR.

Example 2c: Precipitation of Microcrystalline Cellulose Using Gaseous $CO_2$

Figure 3:
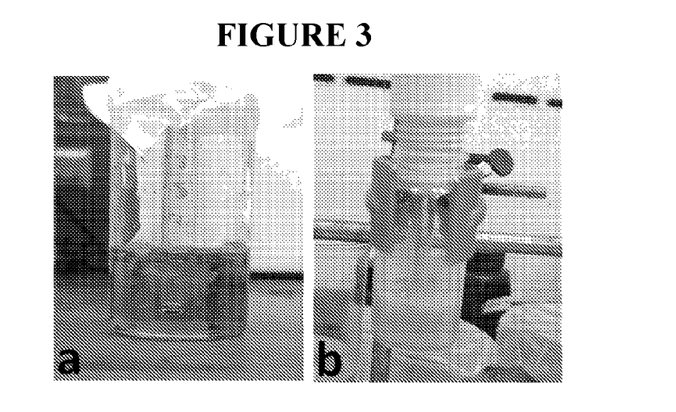
FIG. 3 shows a 5 wt % MCC solution in [$C_2$mim][OAc] (a) after 3 h of bubbling $CO_2$ showing the formation of a white flocculent and (b) the same solution after 10 h of bubbling $CO_2$ where the entire solution solidified into a thick gritty paste.

A 5 wt % microcrystalline cellulose (MCC, degree of polymerization, DP, =270) in [$C_2$mim][OAc] was prepared by microwave dissolution of 341 mg of MCC in 6.5 g of IL in a 20 mL scintillation vial. After dissolution, $CO_{2(g)}$ was bubbled through the clear solution at atmospheric pressure using a syringe immersed into the solution. After 3 h, a precipitate was observed (see FIG. 3) which was confirmed to be MCC by IR spectroscopy. After continuing to bubble $CO_{2(g)}$ for a total of 10 h, the entire solution solidified into a thick, gritty paste. Using this experimental setup it was not possible to separate cellulose and therefore quantification of the MCC recovery was not possible. Upon standing for several minutes, the paste absorbed water from the air and effervesced, resulting in a flocculent solid (MCC) suspended in IL.

In Examples 2a-2c, the precipitation of the biomass can result from chemisorption reaction of $CO_2$ and a carbine generated in situ from the reaction of the basic acetate anion and the acidic C2-proton of the imidazolium cation from [$C_2$mim][OAc]. This reaction thereby effectively removes the acetate anions responsible for solubilizing the biopolymer. In order for this to occur, imidazolium cations and a basic anion, such as acetate are required. Without a basic enough anion, one could benefit from this reaction by the addition of a separate base into the system, such as the addition of $Na_2CO_3$ in [$C_4$mim][Cl].

Example 3: Characterization of the Materials

Figure 4:
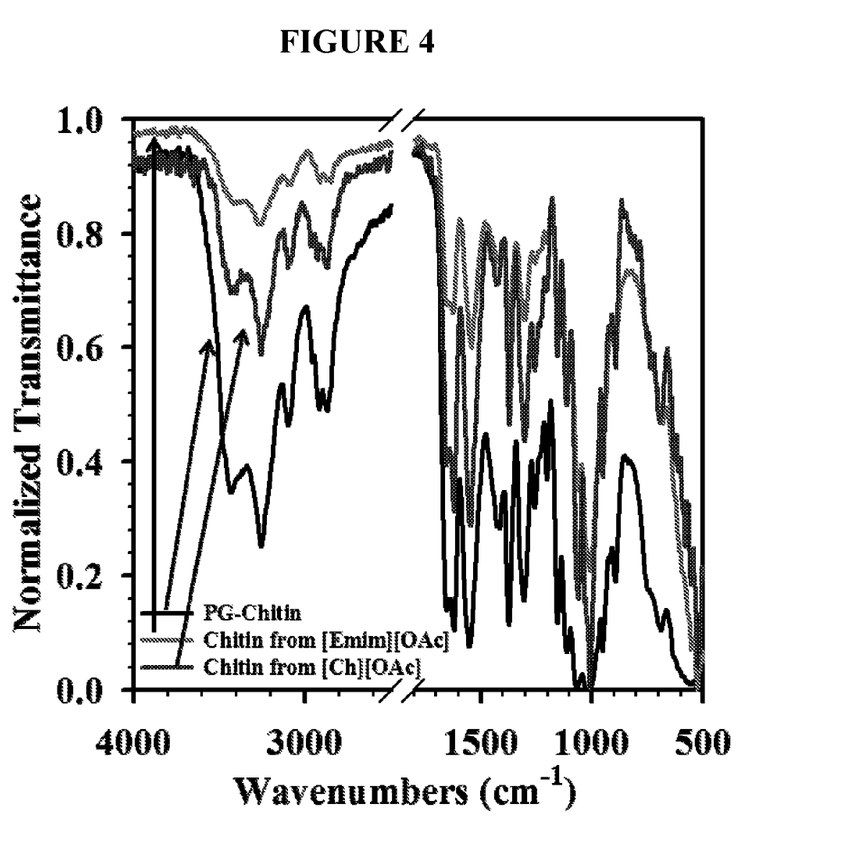
FIG. 4 shows the infrared spectroscopy of practical-grade chitin, the material precipitated from [$C_2$mim][OAc], and the precipitated material from [Ch][OAc].
Figure 5:
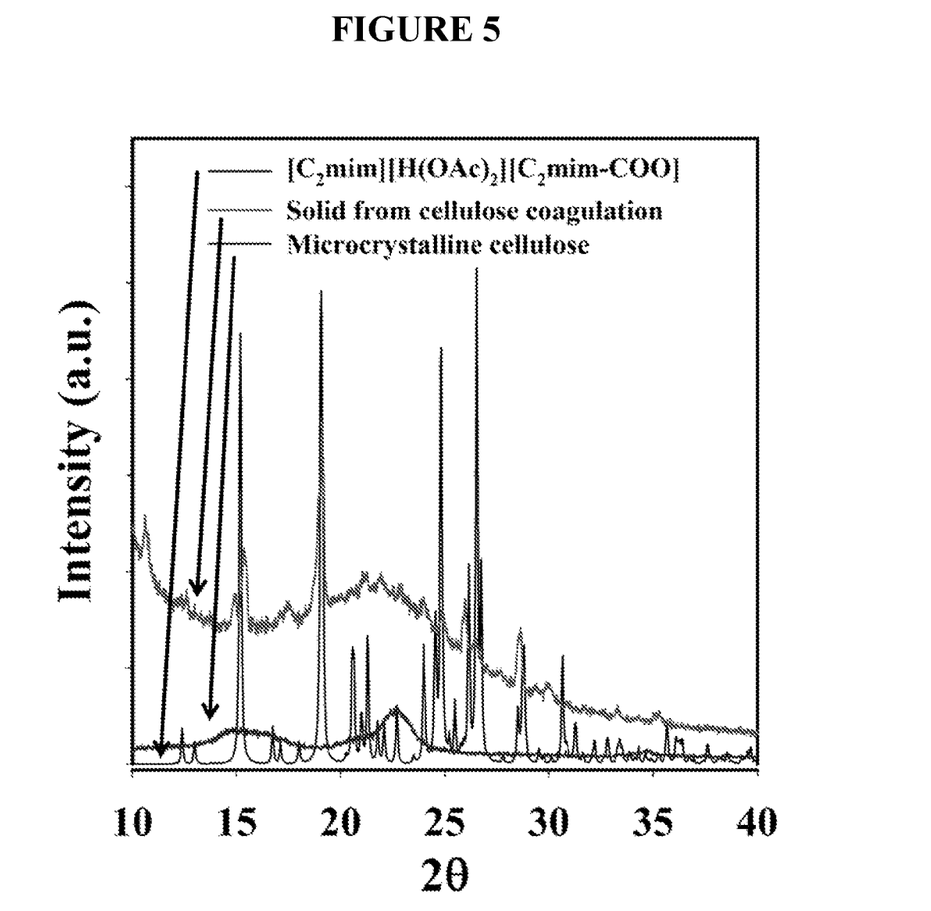
FIG. 5 shows the powder X-ray diffraction of microcrystalline cellulose and the material precipitated using gaseous $CO_2$ from [$C_2$mim][OAc].

The precipitated material was washed with water, dried and characterized by infrared spectroscopy. FIG. 4 shows a comparison of practical-grade chitin, the material precipitated from [$C_2$mim][OAc], and the precipitated material from [Ch][OAc]. The spectra indicate the materials are very similar and sc-$CO_2$ can successfully precipitate chitin from a solution of crustacean shells in ILs. Powder X-ray diffraction analysis of the paste from Example 2c confirmed the presence of MCC within the paste (FIG. 5).

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

SPECIFIC EMBODIMENTS

Disclosed are processes for providing a biopolymer from a biomass. In some embodiments, the process comprises contacting an ionic liquid with the biomass to form a biopolymer comprising solution and adding $CO_2$ to the solution to precipitate the biopolymer from the biopolymer comprising solution. The $CO_2$ can comprise supercritical $CO_2$, gaseous $CO_2$, or combinations thereof. The process can further comprise isolating the precipitated biopolymer.

In some embodiments, the biomass is a chitinous biomass and the biopolymer comprises chitin. For example, the chitinous biomass can comprise the shells of crustaceans such as shrimp shells, crab shells, lobster shells, crawfish shells, prawn shells, or combinations thereof.

In some embodiments, the biomass is a lignocelluosic biomass, such as, for example, softwood or hardwood. In some embodiments, the biopolymer comprises chitin, chitosan, cellulose, hemicelluloses, or combinations thereof.

The biopolymer comprising solution can, for example, be at a temperature of from about 70° C. to about 130° C., or from about 0° C. to about 70° C. In some embodiments, a microwave can be used to heat the biopolymer comprising solution.

In some examples, a co-solvent is added to the ionic liquid. In some examples, an additional base is added to the system. In some embodiments, an insoluble impurity is present in the biopolymer comprising solution. In some embodiments, the insoluble impurity is removes from the biopolymer comprising solution, for example by centrifugation or filtration, before the $CO_2$ is added.

The ionic liquid can comprise, for example, a cation and an anion. The cation can, for example, from the group consisting of imidazolium, pyrazolium, oxazolium, 1,2,3-triazolium, 1,2,4-triazolium, and thiazolium. The anion can, for example, be selected from of $C_{1-6}$ carboxylate, halide, $CO_3^{2-}$; $NO_2^-$, $NO_3^-$, $SO_4^{2-}$, $CN^-$, $R^{10}CO_2$, $(R^{10}O)_2P(=O)$O, $(R^{10}O)S(=O)_2O$, or $(R^{10}O)C(=O)O$; where $R^{10}$ is hydrogen; substituted or unsubstituted linear, branched, or cyclic alkyl; substituted or unsubstituted linear, branched, or cyclic alkoxy; substituted or unsubstituted aryl; substituted or unsubstituted aryloxy; substituted or unsubstituted heterocyclic; and substituted or unsubstituted heteroaryl. For example, the ionic liquid can be a 3-alkyl-1-alkyl imidazolium $C_1$-$C_6$ carboxylate. For another example, the ionic liquid can be 3-ethyl-1-methyl-imidazolium acetate, [C$_2$mim]OAc, or choline acetate, [Ch][OAc].

In some examples, the step where $CO_2$ is added can occur at a temperature of above about 31° C. and pressure of above about 1073 psi (7400 kPa).

The process can further comprise, for example, casting the precipitated biopolymer into a fiber, film or bead.

The process can further comprise, for example, adding an additional polymer or adjunct to the biopolymer comprising solution before the $CO_2$ is added. The additional polymer can be, for example, poly(2-hydroxyethyl methacrylate) (poly-HEMA), poly(lactic acid) (PLA), polyethylterephthalate, polystyrene, polyethylene, or nylon. The adjunct can be, for example, a pharmaceutical, herbicide, insecticide, or food ingredient.

In some embodiments, the process can further comprise removing the $CO_2$ from the ionic liquid to provide a recycled ionic liquid. In some embodiments, the recycled ionic liquid can be used to contact the biomass.

What is claimed is:

1. A process for providing a biopolymer from a biomass, comprising:
    a) contacting an ionic liquid with the biomass to form a biopolymer containing solution, wherein the biomass is a chitinous biomass, the biopolymer comprises chitin, the ionic liquid comprises a cation and an anion, wherein the cation is an imidazolium, and the anion is $C_1$-$C_6$ carboxylate;
    b) adding supercritical $CO_2$ to the solution to precipitate the biopolymer from the biopolymer containing solution; and
    c) removing the $CO_2$ from the ionic liquid to provide a recycled ionic liquid.

2. The process of claim 1, further comprising isolating the precipitated biopolymer.

3. The process of claim 1, wherein the chitinous biomass comprises the shells of crustaceans.

4. The process of claim 1, wherein the chitinous biomass is selected from the group consisting of shrimp shells, crab shells, lobster shells, crawfish shells, prawn shells, and combinations thereof.

5. The process of claim 1, wherein the biomass is contacted with the ionic liquid at a temperature of from about 70° C. to about 130° C.

6. The process of claim 1, wherein the biomass is dissolved or dispersed in the ionic liquid at a temperature of from about 0° C. to about 70° C.

7. The process of claim 1, wherein in step (a) a microwave is used to heat the biopolymer containing solution.

8. The process of claim 1, wherein a co-solvent is added to the ionic liquid.

9. The process of claim 1, wherein an insoluble impurity is present in the biopolymer containing solution and is removed before step (b).

10. The process of claim 9, wherein the impurity is removed by centrifugation or filtration.

11. The process of claim 1, wherein the cation is:

-continued 1,2,4-triazolium thiazolium where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, and $R^5$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

12. The process of claim 1, wherein the ionic liquid is a 3-alkyl-1-alkyl imidazolium $C_1$-$C_6$ carboxylate.

13. The process of claim 1, wherein the ionic liquid is 3-ethyl-1-methylimidazolium acetate.

14. The process of claim 1, wherein step (b) is at a temperature above about 31° C. and a pressure above about 1073 psi (7400 kPa).

15. The process of claim 1, wherein the recycled ionic liquid is used to contact the biomass.

16. The process of claim 1, wherein removing the $CO_2$ from the ionic liquid comprises reducing the pressure and vaporizing the $CO_2$ from the ionic liquid.

17. A process of using a biopolymer, comprising:
a) contacting an ionic liquid with a biomass to form a biopolymer containing solution, wherein the biomass is a chitinous biomass and the biopolymer comprises chitin, wherein the ionic liquid comprises a cation and an anion, wherein the cation is an imidazolium, and wherein the anion is $C_1$-$C_6$ carboxylate;
b) adding supercritical $CO_2$ to the solution to precipitate the biopolymer from the biopolymer containing solution;
c) casting the precipitated biopolymer into a fiber, film or bead; and
d) removing the $CO_2$ from the ionic liquid to provide a recycled ionic liquid.

18. The process of claim 17, further comprising adding an additional polymer or adjunct to the biopolymer containing solution before step (b).

19. The process of claim 18, wherein the additional polymer is poly(2-hydroxyethyl methacrylate) (poly-HEMA) and the adjunct is a pharmaceutical, herbicide, insecticide, or food ingredient.

20. The process of claim 18, wherein the additional polymer is poly(lactic acid) (PLA) and the adjunct is a pharmaceutical, herbicide, insecticide, or food ingredient.

21. The process of claim 18, wherein the additional polymer is polyethylterephthalate, polystyrene, polyethylene, or nylon.

* * * * *

UNITED STATES PATENT AND TRADEMARK OFFICE
CERTIFICATE OF CORRECTION

PATENT NO. : 9,663,589 B2
APPLICATION NO. : 14/767841
DATED : May 30, 2017
INVENTOR(S) : Robin D. Rogers et al.

Page 1 of 1

It is certified that error appears in the above-identified patent and that said Letters Patent is hereby corrected as shown below:

In the Claims

Column 22, Line 41-Column 23, Line 18, (approx.), please replace the text in Claim 11 to the following:

"The process of claim 1, wherein the cation is:

imidazolium
where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, and $R^5$, is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl."

Signed and Sealed this
Eleventh Day of July, 2017

Joseph Matal
*Performing the Functions and Duties of the
Under Secretary of Commerce for Intellectual Property and
Director of the United States Patent and Trademark Office*